US011492462B2

(12) United States Patent
Henze et al.

(10) Patent No.: US 11,492,462 B2
(45) Date of Patent: Nov. 8, 2022

(54) FLAME-RETARDANT COMPOSITION, A METHOD FOR PREPARING THE SAME AND AN ARTICLE THEREFROM

(71) Applicant: BASF SE, Ludwigshafen am Rhein (DE)

(72) Inventors: Oliver Steffen Henze, Lemfoerde (DE); Oliver Muehren, Lemfoerde (DE); Tanja Lange, Lemfoerde (DE); Birte Nitz, Lemfoerde (DE); Sabine Moeller, Lemfoerde (DE); Dirk Rosenbohm, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 114 days.

(21) Appl. No.: 16/761,167

(22) PCT Filed: Nov. 2, 2018

(86) PCT No.: PCT/EP2018/080013
§ 371 (c)(1),
(2) Date: May 1, 2020

(87) PCT Pub. No.: WO2019/086607
PCT Pub. Date: May 9, 2019

(65) Prior Publication Data
US 2020/0347205 A1 Nov. 5, 2020

(30) Foreign Application Priority Data
Nov. 3, 2017 (EP) ..................... 17199829

(51) Int. Cl.
| | | |
|---|---|---|
| *C08K 13/02* | (2006.01) | |
| *C08G 18/44* | (2006.01) | |
| *C08G 18/48* | (2006.01) | |
| *C08K 3/26* | (2006.01) | |
| *C08K 3/32* | (2006.01) | |
| *C08K 5/13* | (2006.01) | |
| *C08K 5/3492* | (2006.01) | |
| *H01B 3/30* | (2006.01) | |
| *H01B 7/295* | (2006.01) | |

(52) U.S. Cl.
CPC .............. *C08K 13/02* (2013.01); *C08G 18/44* (2013.01); *C08G 18/48* (2013.01); *C08K 3/26* (2013.01); *C08K 3/32* (2013.01); *C08K 5/13* (2013.01); *C08K 5/34924* (2013.01); *H01B 3/302* (2013.01); *C08K 2003/265* (2013.01); *C08K 2003/329* (2013.01); *H01B 7/295* (2013.01)

(58) Field of Classification Search
CPC . C08K 13/02; C08K 3/26; C08K 3/32; C08K 5/13; C08K 5/34924; C08K 2003/265; C08K 2003/329; C08G 18/44; C08G 18/48; H01B 3/302; H01B 7/295
See application file for complete search history.

(56) References Cited

U.S. PATENT DOCUMENTS

| | | | |
|---|---|---|---|
| 4,385,133 A | 5/1983 | Alberino et al. | |
| 4,522,975 A | 6/1985 | O'Connor et al. | |
| 5,167,899 A | 12/1992 | Jezic | |
| 5,837,760 A | 11/1998 | Hackl et al. | |
| 9,023,923 B2 | 5/2015 | An et al. | |
| 9,670,337 B2 | 6/2017 | Henze et al. | |
| 9,688,841 B2 | 6/2017 | Henze et al. | |
| 2008/0146711 A1 | 6/2008 | Suzuki et al. | |
| 2010/0324183 A1 | 12/2010 | Henze et al. | |
| 2014/0234621 A1 | 8/2014 | Iwata et al. | |
| 2015/0152222 A1 | 6/2015 | Makadia et al. | |
| 2015/0284536 A1* | 10/2015 | Henze ................... | C08K 5/523 524/101 |
| 2015/0284537 A1 | 10/2015 | Henze et al. | |
| 2016/0083560 A1* | 3/2016 | Fudala ................... | C09K 21/12 524/101 |

FOREIGN PATENT DOCUMENTS

| | | | | |
|---|---|---|---|---|
| CN | 101570632 A | * | 11/2009 | ............. C08L 75/00 |
| CN | 102504751 A | * | 6/2012 | ............. C08J 175/08 |
| CN | 104073150 A | * | 10/2014 | ............ C09D 175/08 |
| CN | 104395402 A | | 3/2015 | |
| CN | 104540924 A | | 4/2015 | |
| CN | 105238013 A | * | 1/2016 | ............. C08L 75/06 |
| DE | 101 03 424 A1 | | 8/2002 | |
| EP | 0 617 079 A2 | | 9/1994 | |
| EP | 0 922 552 A1 | | 6/1999 | |
| EP | 1 491 580 A1 | | 12/2004 | |
| JP | 2010-006965 A | * | 1/2010 | ............. C08L 67/00 |
| JP | 2010-6965 A | | 1/2010 | |
| KR | 20150000687 A | | 1/2015 | |
| WO | WO 03/066723 A2 | | 8/2003 | |

(Continued)

OTHER PUBLICATIONS

International Search Report dated Feb. 11, 2019 in PCT/EP2018/080013, 4 pages.
International Preliminary Report on Patentability dated Dec. 13, 2019 in PCT/EP2018/080013, 7 pages.
Extended European Search Report dated Apr. 11, 2018 in Patent Application No. 17199829.7, 3 pages.

(Continued)

*Primary Examiner* — John E Uselding
(74) *Attorney, Agent, or Firm* — Grüneberg and Myers, PLLC

(57) ABSTRACT

The present invention relates to a flame-retardant composition, a method for preparing the same and an article therefrom. The composition may include at least one thermoplastic polyurethane, at least one primary flame retardant, and at least one metal carbonate particle.

15 Claims, No Drawings

(56) References Cited

FOREIGN PATENT DOCUMENTS

| WO | WO 2006/072461 A1 | 7/2006 |
| WO | WO 2006/121549 A1 | 11/2006 |
| WO | WO 2012/116886 A1 | 9/2012 |

OTHER PUBLICATIONS

Safwan A, Altarazi, et al., "Optimizing Materials Cost and Mechanical Properties of PVC Electrical Cable's Insulation by Using Mixture Experimental Design Approach" International Journal of Industrial and Manufacturing Engineering, vol. 7, No. 3, XP055462842, Mar. 20, 2013, pp. 397-402.

* cited by examiner

FLAME-RETARDANT COMPOSITION, A METHOD FOR PREPARING THE SAME AND AN ARTICLE THEREFROM

The present invention relates to a flame-retardant composition, a method for preparing the same and an article therefrom.

BACKGROUND OF THE INVENTION

Thermoplastic polyurethanes (or TPUs) are generally known for their good mechanical properties, high abrasion resistance and high elasticity. This enables them to find application in a wide variety of areas.

Flame-retardant thermoplastic polyurethanes are well known and described e.g. in EP 0617079 A2, WO 2006/121549 A1 and WO 2003/066723 A2, WO 2006/121549 A1, EP 1491580 A1, US 2015/0284537 A1 and WO 2012/116886 A1. This invention was filed as priority application with EP appl. no. 17199829.7, herein incorporated by reference.

The existing flame-retardant thermoplastic polyurethane compositions often do not show the required combination of flame retardancy, mechanical properties and hydrolysis resistance.

Thus, it was an objective of the present invention to provide a flame-retardant thermoplastic polyurethane composition which has good mechanical properties such as elongation at break, abrasion resistance, or tear propagation resistance, along with good hydrolysis resistance.

SUMMARY OF THE INVENTION

Surprisingly, this objective could be achieved by the composition according to claim 1, the process to produce this composition according to claim 11, an article comprising this composition according to claim 12 and the use of the composition according to claim 13.

DETAILED DESCRIPTION OF THE INVENTION

One aspect to the invention is embodiment 1, which is a composition comprising thermoplastic polyurethane obtained by reacting
(a) a polyol,
(b) an isocyanate, and
(c) optionally a chain extender,
a flame retardant, and
a metal carbonate powder.

The inventive compositions show good mechanical properties such as elongation at break, abrasion resistance, tear propagation resistance, along with better hydrolysis resistance.

Metal Carbonate Powder

The composition of the present invention comprises at least one metal carbonate particle (C), which is in a preferred embodiment a metal carbonate powder. This powder preferably has a volume average particle size $D_{50}$ in the range of $\geq 1.0\ \mu m$ to $\leq 10.0\ \mu m$ determined by laser diffraction analysis according to ISO 13320:2009. It has been observed that the addition of the metal carbonate shows good hydrolysis resistance.

In a preferred embodiment the metal carbonate powder has a volume average particle size $D_{50}$ in the range of $\geq 1.0\ \mu m$ to $\leq 10.0\ \mu m$ determined by laser diffraction analysis according to ISO 13320:2009.

The term "$D_{50}$" refers to the diameter where fifty percent of the particles of the powder have a smaller particle size and fifty percent have a larger particle size. In a preferred embodiment the average particle size $D_{50}$ is in the range of $\geq 1.0\ \mu m$ to $\leq 10.0\ \mu m$ determined by laser diffraction analysis according to ISO 13320:2009. This is because particles smaller in size than the prescribed range are difficult to handle while larger particles result in uneven surface characteristics.

The metal carbonate powder has a volume average particle size $D_{50}$ preferably in the range of $\geq 1.0\ \mu m$ to $\leq 9.0\ \mu m$, $\geq 1.0\ \mu m$ to $\leq 8.0$, $\geq 1.0\ \mu m$ to $\leq 7.0\ \mu m$, $\geq 1.0\ \mu m$ to $\leq 5.0\ \mu m$ determined by laser diffraction analysis according to ISO 13320:2009.

In a preferred embodiment the metal carbonate powder has a BET surface area in the range of $\geq 1\ m^2/g$ to $\leq 50\ m^2/g$. By the term "BET surface area", it is hereby referred to the surface area measured using the Brunauer-Emmett-Teller theory. Any suitable equipment well known to the person skilled in the art can be employed for this purpose. Preferably, the BET surface area is in the range of $\geq 1\ m^2/g$ to $\leq 45\ m^2/g$, or $\geq 1\ m^2/g$ to $\leq 40\ m^2/g$, or $\geq 1\ m^2/g$ to $\leq 35\ m^2/g$. More preferably, it is in the range of $\geq 1\ m^2/g$ to $\leq 30\ m^2/g$, or $\geq 1\ m^2/g$ to $\leq 25\ m^2/g$, or $\geq 1\ m^2/g$ to $\leq 20\ m^2/g$, or $\geq 1\ m^2/g$ to $\leq 15\ m^2/g$. Most preferably, it is in the range of $\geq 1\ m^2/g$ to $\leq 10\ m^2/g$.

The water content in the metal carbonate powder is $\leq 5.0$ wt.-%, preferably $\leq 3.0$ wt.-%, more preferably $\leq 1.0$ wt.-%, more preferably $\leq 0.6$ wt.-%, most preferably $\leq 0.3$ wt.-% based on the weight of the metal carbonate powder.

In a preferred embodiment 2 comprising all features of embodiment 1 or the preferred embodiments of embodiment 1, the metal carbonate powder is present in an amount in between 0.1 wt.-% to 10.0 wt.-% based on the total weight of the composition. Further preferred ranges are selected from the following group of ranges $\geq 0.1$ wt.-% to $\leq 9.5$ wt.-%, $\geq 0.1$ wt.-% to $\leq 9$ wt.-%, $\geq 0.1$ wt.-% to $\leq 8.5$ wt.-%, $\geq 0.1$ wt.-% to $\leq 8.0$ wt.-%, $\geq 0.5$ wt.-% to $\leq 8.0$ wt.-%, $\geq 0.5$ wt.-% to $\leq 7.5$ wt.-%, $\geq 0.5$ wt.-% to $\leq 7.0$ wt.-%, $\geq 0.5$ wt.-% to $\leq 6.5$ wt.-%, $\geq 0.5$ wt.-% to $\leq 6.0$ wt.-%. Most preferably this range is $\geq 0.5$ wt.-% to $\leq 5.5$ wt.-%, or $\geq 0.5$ wt.-% to $\leq 5.0$ wt.-%. In a very preferred embodiment, the at least one metal carbonate particle, preferably the metal carbonate powder, is present in an amount in the range of $\geq 0.5$ wt.-% to $\leq 2.0$ wt.-% based on the total weight of the composition.

In another preferred embodiment 3, comprising all features of embodiment 1 or 2, respectively their preferred embodiments, the at least one metal carbonate particle, preferably the metal carbonate powder, is selected from the group consisting of calcium carbonate, magnesium carbonate, aluminum carbonate, zinc carbonate, lithium carbonate, beryllium carbonate, strontium carbonate, barium carbonate, and rubidium carbonate. More preferably, the metal carbonate is selected from the group consisting of calcium carbonate, magnesium carbonate, aluminum carbonate, and zinc carbonate. Even more preferably metal carbonate is selected from the group consisting of calcium carbonate, magnesium carbonate, and aluminum carbonate.

In preferred embodiment 4 comprising all features of one of the embodiments 1 or 2, respectively their preferred embodiments, the metal carbonate powder is calcium carbonate.

In a preferred embodiment the metal carbonate particles of the metal carbonate powder have a volume average particle size $D_{50}$ in the range of $\geq 1.0\ \mu m$ to $\leq 10.0\ \mu m$, preferably determined by laser diffraction analysis according to ISO 13320:2009.

Polyol

By the term polyol, it is referred to the polymer backbones containing preferably two hydroxyl groups, sometimes also referred to as polyalcohols, or referred to as compound reactive towards isocyanate.

The number average molecular weight Mn of the polyol is in the range of 500 to 4000 g/Mol determined according to DIN 55672-1.

The number average molecular weight Mn in the context of this invention is preferably determined according to DIN 55672-1.

Preferably, the number average molecular weight Mn of the polyol is in the range of 500 g/Mol to 3800 g/Mol, more preferably in the range of 600 g/Mol to 3800 g/Mol, more preferably in the range of 700 g/Mol to 3600 g/Mol, more preferably in the range of 800 g/Mol to 3400 g/Mol, more preferably in the range of 900 g/Mol, more preferably in the range of 3200 g/Mol, or 900 g/Mol to 3000 g/Mol. In a particularly preferred embodiment, the number average molecular weight Mn of the polyol is in the range of 900 to 2500 g/Mol.

The polyol in preferred embodiment is characterized with an OH value in the range of ≥30 mg KOH/g to ≤150 mg KOH/g determined according to DIN 53240. Preferably, the OH value is in the range of ≥35 mg KOH/g to ≤150 mg KOH/g. More preferably, the OH value is in the range of ≥35 mg KOH/g to ≤140 mg KOH/g determined according to DIN 53240. Most preferably, the OH value is in the range of ≥40 mg KOH/g to ≤140, or ≥40 mg KOH/g to ≤130, or ≥40 mg KOH/g to ≤120 mg KOH/g determined according to DIN 53240. In a particularly preferred embodiment, the polyol (a) has an OH value preferably in the range of ≥45 mg KOH/g to ≤120 mg KOH/g determined according to DIN 53240.

In preferred embodiment 5 the composition of any of the embodiments 1 to 4, respectively their preferred embodiments, the polyol is polyether polyol or polycarbonate polyol.

Preferred polyether diols are selected from the group of polyoxyethylene diol, polyoxypropylene diol, poly(oxyethylene-oxypropylene)diol, polytetrahydrofurane, herein also referred to as PTHF.

Preferably, the polyether polyol has a number average molecular weight $M_n$ in the range of ≥500 g/Mol to ≤2000 g/Mol, preferably ≥500 g/Mol to ≤1800 g/Mol, more preferably ≥500 g/Mol to ≤1500 g/Mol, most preferably ≥800 g/Mol to ≤1500 g/Mol.

Especially preferred as polyether diol is polytetrahydrofurane (PTHF), more preferably with a number average molecular weight of ≥800 g/Mol to ≤1500 g/Mol, even more preferred ≥900 g/Mol to ≤1100 g/Mol.

In a preferred embodiment the polyol is a polycarbonate polyol, more preferable a aliphatic polycarbonate diol. Polycarbonate polyol is herein also referred to as polycarbonate diol. The polycarbonate diol in a preferred embodiment is linear and has terminal hydroxyl groups. The essential reactants are glycols and carbonates. Glycols are also referred to as alkane diol. Suitable glycols or alkane diols are selected from aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms.

Preferred alkane diols are selected from the group consisting of 1,3-Propandiol, 1,4-butanediol, 1,5-pentanediol, neopentyl glycol, 1,6-hexanediol, 1,6-2,2,4-trimethylhexanediol, 1,10-decanediol, hydrogenated dilinoleylglycol, hydrogenated dioleylglycol.

In a more preferred embodiment, the polycarbonate diol is derived from at least one alkane diol selected from the group consisting of 1,3-propanediol, 1,5-pentanediol, 1,6-hexanediol.

In a preferred embodiment the number average molecular weight of the polycarbonate diol is ≥1000 g/Mol to ≤3000 g/Mol, more preferred ≥1500 g/Mol to ≤2500 g/Mol, most preferred ≥1800 g/Mol to ≤2200 g/Mol.

Flame Retardant

The composition of the present invention also comprises at least one primary flame retardant.

A preferred kind of flame retardant is a nitrogen based compound selected from the group consisting of benzoguanamine, tris(hydroxyethyl)isocyanurate, isocyanurate, allantoin, glycoluril, melamine, melamine cyanurate, melamine polyphosphate, dimelamine phosphate, melamine pyrophosphate, melamine borate, ammonium polyphosphate, melamine ammonium polyphosphate, melamine ammonium pyrophosphate, condensation product of melamine selected from the group consisting of melem, melam, melon and higher condensed compounds and other reaction products of melamine with phosphoric acid, melamine derivatives.

More preferably, the flame retardant is selected from the group consisting of melamine, melamine cyanurate, melamine polyphosphate, dimelamine phosphate, melamine pyrophosphate, melamine borate, ammonium polyphosphate, melamine ammonium polyphosphate, melamine ammonium pyrophosphate, and melamine derivatives.

Most preferably, the flame retardant is selected from the group consisting of melamine, melamine cyanurate, melamine borate, melamine polyphosphate and melamine derivatives. In very preferred embodiment, the flame retardant (B) is melamine cyanurate. Melamine cyanurate is hereinafter interchangeably referred to as 1,3,5-triazine-2,4,6(1H,3H,5H)-trione.

In a preferred embodiment the flame retardant is a combination of more than one flame retardant, either of the same kind or of different kinds.

Another kind of flame retardant is an inorganic flame retardant and is preferably selected from the group consisting of magnesium oxide, magnesium hydroxide, silicon oxide, and aluminum oxide.

Yet another kind of flame retardant is a phosphorus containing flame retardant. The phosphorus containing flame retardant preferably is liquid at 21° C.

Preference is given to derivatives of the phosphoric acid, derivatives of the phosphonic acid, or derivatives of the phosphinic acid, or a mixture of two or more of said derivatives.

It is preferable that the derivatives of the phosphoric acid, phosphonic acid, or phosphinic acid involve salts with an organic or an inorganic cation or involve organic esters. In one preferred embodiment, the organic ester involves an alkyl ester, and in another preferred embodiment it involves an aryl ester. It is particularly preferable that all the hydroxy groups of the corresponding phosphorus-containing acid have been esterified.

Organic phosphate esters are preferred, particularly the triesters of phosphoric acid, more preferred are the trialkyl phosphates. Other preferred embodiments are triaryl phosphates, especially preferred is triphenyl phosphate.

In another embodiment, the phosphoric esters has the general formula (I)

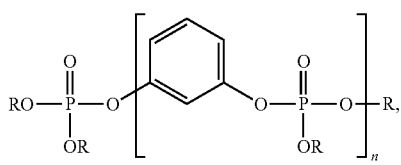

(I)

where R denotes substituted alkyl, cycloalkyl, or phenyl groups, and n is a real number in the range of ≥1 to ≤15.

If R in the general formula (I) is an alkyl moiety, alkyl moieties that preferably are used are those having from 1 to 8 carbon atoms. The cyclohexyl moiety may be mentioned as a preferred example of the cycloalkyl groups. It is preferable to use phosphoric esters of the general formula (I) in which R denotes a phenyl or alkyl-substituted phenyl. Preferably, n is 1, or in the range of ≥3 to ≤6. Very preferred phosphoric esters of the general formula (I) are bis(diphenyl) 1,3-phenylenephosphate, bis(dixylenyl) 1,3-phenylenephosphate, and also the corresponding oligomeric products, preferably with an average degree of oligomerization of n in the range of ≥3 to ≤6.

A very preferred phosphoric ester is resorcinol, more preferred resorcinol bis(diphenyl phosphate) (RDP). RDP preferably is present in oligomers.

Other preferred phosphorus containing flame retardants are bisphenol A bis(diphenyl phosphate) (BDP). and diphenyl cresyl phosphate (DPC). BPD usually takes the form of an oligomer.

The organic phosphates involve salts with an organic or inorganic cation or involve the esters of phosphonic acid. Preferred esters of phosphonic acid are the diesters of alkyl- or phenylphosphonic acids.

Other preferred phosphorus contain flame retardants are phosphinic esters having the general formula $R_1R_2(P=O)OR_3$, where all three organic groups $R_1$, $R_2$ and $R_3$ in one preferred embodiment are identical or in another preferred embodiment are different from each other. The moieties $R_1$, $R_2$ and $R_3$ are in one preferred embodiment aliphatic in another preferred embodiment aromatic, and more preferably have from 1 to 20 carbon atoms, more preferably from 1 to 10. In one preferred embodiment the aliphatic groups have from 1 to 3 carbon atoms. It is preferable that at least one of the organic group is aliphatic, and it is more preferable that all of the organic groups are aliphatic. In one preferred embodiment $R_1$ and $R_2$ are ethyl moieties, more preferably in this embodiment $R_3$ is also an ethyl group or is a methyl group. In one preferred embodiment, $R_1$, $R_2$ and $R_3$ are simultaneously either an ethyl group or a methyl group.

Preference is also given to phosphinate, which is the salt of phosphinic acid. The groups $R_1$ and $R_2$ are either aliphatic or aromatic, and have from 1 to 20 carbon atoms, preferably from 1 to 10, more preferably from 1 to 3. It is preferable that at least one of the moieties is aliphatic, and it is preferable that all the moieties are aliphatic, and it is very particularly preferable that $R_1$ and $R_2$ are ethyl groups. Preferred salts of phosphinic acids are aluminum, calcium, or zinc salts, more preferred is aluminium.

The most preferred phosphinate is aluminium diethyl phosphinate.

The flame retardant is used in the form of single substance or in mixtures of several substances of either the same kind of flame retardants or different kind of flame retardants in the composition.

Preferably the flame retardant has a volume average particle size $D_{99} \leq 100$ μm, preferably ≤80 μm, more preferably ≤60 μm, most preferably ≤50 determined by laser diffraction analysis according to ISO 13320:2009.

Additionally, in a preferred embodiment the flame retardant has a volume average particle size $D_{50} \leq 20$ μm, preferably ≤16 μm, more preferably ≤12 μm, more preferably ≤8 μm, and most preferably ≤5 μm.

In a preferred embodiment the water content in the at least one primary flame retardant (B) is ≤5.0 wt.-%, more preferably ≤3.0 wt.-%, more preferably ≤1.0 wt.-%, more preferably ≤0.6 wt.-%, and most preferably ≤0.3 wt.-%.

The amount of the flame retardant in the composition, as described hereinabove, is preferably in the range of ≥1 wt.-% to ≤80 wt. % based on the total weight of the composition. Preferably, it is in the range of ≥5 wt.-% to ≤80 wt. %, or ≥5 wt.-% to ≤75 wt. %, or ≥5 wt.-% to ≤70 wt. %, or ≥5 wt.-% to ≤65 wt. %, or ≥5 wt.-% to ≤60 wt. % based on the total weight of the composition. More preferably, it is in the range of ≥10 wt.-% to ≤60 wt. %, or ≥10 wt.-% to ≤55 wt. %, or ≥10 wt.-% to ≤50 wt. %, or ≥10 wt.-% to ≤45 wt. % based on the total weight of the composition. Most preferably, it is in the range of ≥15 wt.-% to ≤45 wt. %, or ≥15 wt.-% to ≤40 wt. %, or ≥15 wt.-% to ≤35 wt. % based on the total weight of the composition. In an embodiment, the flame retardant is in the range of ≥15 wt.-% to ≤30 wt. % based on the total weight of the composition.

In preferred embodiment 6 comprising the features of one of the embodiments 1 to 5, respectively one of their preferred embodiments, the flame retardant is selected from the group consisting of melamine, melamine cyanurate, melamine borate, melamine polyphosphate, melamine derivative, derivative of phosphoric acid, derivative of phosphonic acid, and derivative of phosphinic acid.

In another preferred embodiment 7 comprising the features of one of the embodiments 1 to 5, respectively one of their preferred embodiments, the flame retardant comprises a mixture of a derivative of phosphoric acid and melamine cyanurate. The most preferred phosphoric acid is resorcinol bis(diphenyl phosphate) (RDP).

In a preferred embodiment 8 comprising the features of one of the embodiment 1 to 7, respectively one of its preferred embodiments, the composition comprises further at least one additive selected from the group consisting of antioxidant, light stabilizer, UV absorbers, and other stabilizers.

In a preferred embodiment the amount of the at least one additive in the composition is in the range of ≥0.1 wt.-% to ≤10.0 wt.-% based on the total weight of the composition.

In a preferred embodiment 9 the embodiment comprising all features of embodiment 8, respectively one of its preferred embodiments, the antioxidant contains an active group of the general formula (II),

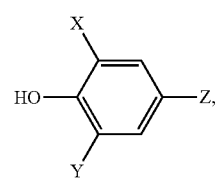

(II)

wherein,

X and Y, independently of one another, are hydrogen atom or straight-chain, branched or cyclic alkyl radicals of 1 to 12 carbon atoms, and Z is a covalent bond via which the active group is bonded to the remaining molecule of the antioxidant and wherein the active group of general formula (II) is further connected by a connecting residue (III) such that the antioxidant has the following structure:

(II)-X—R—[Y—R]$_n$—X-(II)

or

[(II)-X—R—[Y—R]$_n$—Y]$_m$-A wherein,

X: —O—, —S— or —NH—,

Y: —O— or —S—,

R is $C_2$ to $C_{12}$ alkylene, the alkylene radical being straight chain or branched, n is an integer, m is 2, 3, 4, 5, 6, 7 or 8, and A is a hydrocarbon structure containing 3 to 20 carbon atoms.

In the preferred embodiment 10 comprising all features of embodiment 8, respectively one of its preferred embodiments, the antioxidant is selected from the group consisting of pentaerythrityl tetrakis(3-(3,5-bis(1,1-dimethylethyl)-4-hydroxyphenyl)propionate, (N,N'-hexamethylenebis(3,5-di-tert-butyl-4-hydroxy-hydrocinnamide), 3-(3,5-di-tert-butyl-4-hydroxyphenyl)propionate-terminated polyethyleneglcyol, 3-(3,5-di-tert-butyl-4-hydroxyphenyl) propionate-terminated polytetrahydrofuran.

In a preferred embodiment the composition is a granulate or a powder.

The composition, as described in the embodiments, preferably has a weight average molecular weight $M_n$ of at least $0.02 \times 10^6$ g/Mol, more preferably at least $0.06 \times 10^6$ g/Mol and in particular more than $0.08 \times 10^6$ g/Mol, preferably determined according to DIN 55672-1. The upper limit for the weight average molecular weight $M_n$ of the composition is generally determined by processability, and by the range of properties desired. However, the number average molecular weight $M_n$ of the composition is not above $0.2 \times 10^6$ g/Mol, preferably $0.15 \times 10^6$ g/Mol determined according to DIN 55672-1.

In preferred embodiments the embodiments as outlined herein have a shore hardness ranging from 40 Shore A to 80 Shore D, preferably 65 Shore A to 75 Shore D, more preferably 70 Shore A to 65 Shore D determined according to ASTM D2240.

For the purpose of the present invention, the polyol (a), the isocyanate and the at least one chain extender are also, individually or together, termed structural components.

Isocyanate

In a preferred embodiment the isocyanate is an organic isocyanate. The term polyisocyanate, as used herein, refers to an isocyanate comprising preferably two N=C=O groups, also referred to as diisocyanate. Dimers and trimers and oligomers of the isocyanates discussed herein are also comprised by the respective isocyanate.

The isocyanate preferably is an aliphatic diisocyanate, cycloaliphatic polyisocyanate, or an aromatic polyisocyanate. In a further preferred embodiment, the isocyanate is a diisocyanate. Representative examples of these preferred diisocyanates may be found, for example, from U.S. Pat. Nos. 4,385,133, 4,522,975 and 5,167,899, all incorporated herein by reference.

In a preferred embodiment, the polyisocyanate is selected from the group consisting of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate and 2-methyl-1,5-pentamethylene diisocyanate.

In a preferred embodiment the isocyanate is selected from the group consisting of cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)cyclohexane diisocyanates, 4,4'- and 2,4'-bis(isocyanatomethyl) dicyclohexane and isophorone diisocyanate.

In another preferred embodiment the isocyanate is selected from the group consisting 2,4- and 2,6-hexahydro-toluenediisocyanate, 1,2-, 1,3-, and 1,4-phenylene diisocyanates, triphenyl methane-4,4',4''-triisocyanate, naphthylene-1,5-diisocyanate, 2,4- and 2,6-toluene diisocyanate, 2,4'-, 4,4'- and 2,2-biphenyl diisocyanates, 2,2'-, 2,4'- and 4,4'-diphenylmethane diisocyanate, polyphenyl polymethylene polyisocyanates, 1,2-, 1,3- and 1,4-xylylene diisocyanates and m-tetramethylxylyene diisocyanate (TMXDI).

In another preferred embodiment the isocyanate is selected from the group consisting of diphenylmethane 4,4'-diisocyanate, tolylene 2,6-diisocyanate, dicyclohexyl-methane 2,2'-diisocyanate, hexamethylene 1,6-diisocyanate, paraphenylene 2,4-diisocyanate, tetramethylenexylene 2,4-diisocyanate, 2 methylpentamethylene 1,5 diisocyanate, 2 ethylbutylene 1,4 diisocyanate, pentamethylene 1,5 diisocyanate, butylene 1,4 diisocyanate and 1 isocyanato-3,3,5 trimethyl-5 isocyanatomethylcyclohexane.

More preferably, the isocyanate is selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate, tetramethylenexylene 2,4-diisocyanate, 2 methylpentamethylene 1,5 diisocyanate and 2 ethylbutylene 1,4 diisocyanate.

Most preferably, the isocyanate is selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate and tetramethylenexylene 2,4-diisocyanate.

In a particularly preferred embodiment, the isocyanate is a diphenylmethane 4,4'-diisocyanate (hereinafter referred as MDI).

Chain Extender

The term chain extender refers to diols having a molecular weight in the range of ≥50 to ≤499 g/Mol, in one preferred embodiment ≥50 to ≤350 g/Mol. The chain extend is preferably selected from the group of di- and/or tri-functional alcohols, di- to tetra-functional polyoxyalkylene polyols and of alkyl-substituted aromatic diamines.

The chain extender is preferably $C_2$ to $C_{12}$ alkane diol, or $C_2$ to $C_6$ alkane diol. More preferably the chain extender is selected from the group of ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol. Preferred chain extending and/or crosslinking agents further include dialkylene glycols having 4 to 8 carbon atoms, preferably diethylene glycol and dipropylene glycol and/or di-, tri- or tetrafunctional polyoxyalkylene polyols.

Other preferred embodiments of the chain extender are branched and/or unsaturated alkanediols having preferably not more than 12 carbon atoms, preferably they are selected from the group of 1,2-propanediol, 2 methylpropanediol-1,3, 2,2-dimethylpropanediol-1,3, 2-butyl-2-ethylpropanediol-1,3, butene-2 diol-1,4 and butyne-2-diol-1,4, diesters of terephthalic acid with glycols of 2 to 4 carbon atoms, preferably terephthalic acid bis-ethylene glycol-1,4 or -butanediol-1,4, hydroxyalkylene ethers of hydroquinone or of resorcinol, preferably 1,4-di(β-hydroxyethyl)hydroquinone or 1,3 di(β-hydroxyethyl)resorcinol, alkanolamines having 2 to 12 carbon atoms, preferably ethanolamine, 2-aminopropanol and 3-amino-2,2-dimethylpropanol, N-alkyldialkanolamines, preferably N-methyl- and N-ethyldiethanolamine.

To obtain specific mechanical properties, the alkyl-substituted aromatic polyamines are preferably also used in admixture with the aforementioned low molecular weight polyhydric alcohols, preferably di- and/or tri-hydric alcohols or dialkylene glycols.

Particularly preferably, the chain extender (c) is selected from the group consisting of ethylene glycol, diethylene glycol, triethylene glycol, 1,3-propanediol, 1,4-butanediol, 1,5-pentanediol, 1,6-hexanediol, hydroquinone bis 2-hydroxyethyl ether, bis-2(hydroxyl ethyl)-terephthalate, glycerine and triethanolamine. In a very preferred embodiment, the chain extender (c) is 1,4-butanediol.

Catalyst

In a preferred embodiment the thermoplastic polyurethane of the composition embodiments further comprises a catalyst and/or an auxiliary and/or additive.

Preferably the catalyst is a tertiary amine selected from the group consisting of triethylamine, dimethylcyclohexylamine, N-methylmorpholine, N,N'-dimethylpiperazine, 2-(dimethylaminoethoxy)ethanol and diazabicyclo[2.2.2]octane. In another preferred embodiment, the catalyst is an organometallic compound selected from the group consisting of titanic esters, iron compounds, preferably iron(III) acetylacetonate, tin compounds, preferably tin diacetate, tin dioctoate, tin dilaurate, or the dialkyltin diacetate, dibutyltin dilaurate, or bismuth salts in which bismuth is preferably present in the oxidation states 2 or 3, in particular 3. Preference is given to salts of carboxylic acids. Carboxylic acids used preferably comprise carboxylic acids having from 2 to 14 carbon atoms, particularly preferably having from 4 to 12 carbon atoms. Preferred examples of suitable bismuth salts are bismuth(III)neodecanoate, bismuth 2-ethylhexanoate and bismuth octonoate.

It is preferable to use tin catalysts, in particular tin dioctoate.

Amounts preferably used of the catalyst are in the range of ≥0.0001 to ≤0.1 part by weight per 100 parts by weight of the at least one polyol (a).

In other preferred embodiments the thermoplastic polyurethane further comprises a auxiliary and/or additive preferably selected from the group consisting of surfactant, filler, nucleating agent, oxidation stabilizer, lubricants and mold-release aids, dyes and pigments, and optionally stabilizer, e.g. for protection from hydrolysis, light, heat, or discoloration, inorganic and/or organic fillers, reinforcing agents and plasticizers. Suitable auxiliaries and additives can be found by way of example in Kunststoffhandbuch [Plastics handbook], volume VII, edited by Vieweg and Hochtlen, Carl Hanser Verlag, Munich 1966 (pp. 103-113).

All components of the composition mentioned may be used either alone or in combination with at least one component of the same kind.

In one preferred embodiment the composition of the present invention comprises the thermoplastic polyurethane in an amount in the range of ≥20 wt.-% to ≤99 wt.-% based on the total weight of the composition.

Preferably, the at least one thermoplastic polyurethane (A) is present in an amount in the range of ≥25 wt.-% to ≤99 wt.-%, or ≥25 wt.-% to ≤95 wt.-%, or ≥30 wt.-% to ≤95 wt.-%, or ≥35 wt.-% to ≤95 wt.-% based on the total weight of the composition. More preferably, it is in the range of ≥35 wt.-% to ≤90 wt.-%, or ≥40 wt.-% to ≤90 wt.-%, or ≥45 wt.-% to ≤90 wt.-% based on the total weight of the composition. Most preferably, it is in the range of ≥50 wt.-% to ≤90 wt.-%, or ≥55 wt.-% to ≤90 wt.-%, or ≥55 wt.-% to ≤85 wt.-% based on the total weight of the composition. In an embodiment, the at least one thermoplastic polyurethane (A) is present in an amount in the range of ≥60 wt.-% to ≤85 wt.-% based on the total weight of the composition.

Process

Another aspect of the present invention is the process for preparing one of the embodiments 1 to 10 respectively their preferred embodiments as described above, by mixing the thermoplastic polyurethane, the flame retardant and the metal carbonate powder.

In one preferred embodiment said process comprises the steps of:

mixing the thermoplastic polyurethane, the flame retardant) and the at least one metal carbonate particle, preferably the metal carbonate powder, optionally in the presence of at least one additive and/or auxiliary. The mixture is preferably homogeneous.

Mixing can occur in any commonly used mixing device able to provide mixing, preferably shear mixing.

In one embodiment the thermoplastic polyurethane, preferably the composition is pelletized to granules. The TPU is melted at a temperature in the range of ≥150° C. to ≤215° C. The particular temperature used will depend on the thermoplastic polyurethane used.

The components of the composition may be preblended before adding to the extruder or they may be added or metered into the extruder in different streams and in different zones of the extruder.

Suitable production processes for the thermoplastic polyurethane of the embodiments of the composition are further disclosed by way of example in EP 0922552 A1, DE 10103424 A1, or WO 2006/072461 A1, herein incorporated by reference. The production process preferably takes place in a belt system or a reactive extruder. In one embodiment all components of the thermoplastic polyurethane are mixed with one another in a one-shot process. In other preferred embodiments individual components are premixed and/or pre-reacted, preferably the isocyanate and the polyol is premixed in a first step to give a prepolymer, also referred to as prepolymer-process and the prepolymer is mixed with the other components. In another preferred embodiment, the TPU is produced from the structural components in a first step, optionally in the presence of a catalyst, auxiliary and/or an additive then optionally are incorporated into the thermoplastic polyurethane. In a second step the flame retardant and metal carbonate powder is introduced into the thermoplastic polyurethane, and homogenously dispersed or mixed. The homogeneous dispersion or mixture is preferably achieved in an extruder, preferably in a twin-screw extruder, preferably having multiple heat zones and/or multiple feed ports.

The thermoplastic polyurethane of the embodiments of the composition is preferably produced by a reactive extruder, a belt system, or other suitable apparatuses, preferably in the form of granules.

Process for Producing a Wire

Another aspect of the present invention is directed to a process for producing a wire and/or cable construction comprising the steps of extruding an insulation layer of the described composition or the composition obtained according to the above process onto at least one conductor, preferably a metal conductor to obtain a wire and/or cable construction. This construction having preferably a tear propagation resistance of at least 60 kN/m determined according to DIN ISO 34-1 B(b).

Article

Another aspect of the present invention is embodiment 12, an article comprising the composition according to one of claims 1 to 10, respectively their preferred embodiments.

In one preferred embodiment said article comprises an injection molded part, parts deriving from calendaring, extrusion, powder sintering, or moulding. Preferably, the article is an insulator of an electric wire and/or electric cable or an electric wire and/or electric cable sheath.

In a preferred embodiment the article is a wire and/or cable construction comprising:

at least one metal conductor, and an insulation layer of the above composition as outlined in one of the embodiments The wire and/or cable construction preferably meets the requirements of ISO 6722 or LV112 for 3000 h at 85° C. and 85% relative humidity and 3000 h at 125° C.

Use

Another aspect of the current invention is embodiment 13, the use of the composition as described in one of the compositions embodiments 1 to 10, respectively their preferred embodiments, or as obtained according to the embodiment 11 of the process, respectively its preferred embodiment, for the production of an article deriving from calendaring, extrusion, powder sintering, or moulding.

The composition may be utilized in any application where high flame retardant performance is desired. Moreover, since the composition, in addition to improved flame retardancy, also show improved mechanical properties such as elongation at break, abrasion resistance, tear propagation resistance, along with better hydrolysis resistance over a broad shore hardness range, it can be used for various other applications.

Preferred articles are selected form the group of films, foils, fiber, coatings, seals, shoe soles, rollers, cladding in automobiles, hoses, coatings, cables, profiles, laminates, floors for buildings and transport, plug connectors, cushion, saddle, cable plugs, folding bellows, drag cables, solar modules, wiper blades, cable sheathing, gaskets, drive belts, nonwoven textiles, damping or damping elements.

Other preferred articles are for use in automobile applications, jacketing for armored cable, industrial robotic equipment, non-metallic sheath cable, deep well pump cables and other multiple conductor assemblies and consumer goods.

In embodiment 14 the article is an insulator. In a more preferred embodiment the insulator is a thermal and/or electrical insulator for electrical conductors or is jacketing electrical conductors in a wire and/or cable construction.

The present invention is illustrated in more detail by the following embodiments and combinations of embodiments which result from the corresponding dependency references and links:

1. A composition comprising:
   (A) at least one thermoplastic polyurethane,
   (B) at least one primary flame retardant, and
   (C) at least one metal carbonate particle,
   wherein the at least one thermoplastic polyurethane (A) has a Shore A hardness of 40 to a Shore D hardness of 80 determined according to DIN ISO 7619-1 (3s), and wherein the at least one metal carbonate particle (C) has a volume average particle size $D_{50}$ in the range of $\geq 1.0$ μm to $\leq 10.0$ μm determined by laser diffraction analysis according to ISO 13320:2009.

2. The composition according to embodiment 1, characterized in that the amount of the at least one thermoplastic polyurethane (A) is in the range of $\geq 20$ wt.-% to $\leq 99$ wt.-% based on the total weight of the composition.

3. The composition according to embodiment 1 or 2, characterized in that the at least one thermoplastic polyurethane (A) comprises:
   (a) at least one polyol,
   (b) at least one isocyanate, and
   (c) at least one chain extender.

4. The composition according to embodiment 3, characterized in that the at least one polyol is selected from the group consisting of polyether polyol (a1) and polycarbonate polyol (a2).

5. The composition according to embodiment 3 or 4, characterized in that the polyether polyol (a1) is derived from compounds selected from the group consisting of ethylene oxide, propylene oxide, butylene oxide and tetrahydrofuran.

6. The composition according to one or more of embodiments 3 to 5, characterized in that the polycarbonate polyol (a2) is derived from at least one alkanediol selected from the group consisting of butanediol, pentanediol and hexanediol.

7. The composition according to one or more of embodiments 3 to 6, characterized in that the at least one isocyanate (b) is a diisocyanate selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate, tetramethylenexylene 2,4-diisocyanate, 2 methylpentamethylene 1,5 diisocyanate, 2 ethylbutylene 1,4 diisocyanate, pentamethylene 1,5 diisocyanate, butylene 1,4 diisocyanate and 1 isocyanato-3,3,5 trimethyl-5 isocyanatomethylcyclohexane.

8. The composition according to one or more of embodiments 3 to 7, characterized in that the at least one isocyanate (b) is diphenylmethane 4,4'-diisocyanate.

9. The composition according to one or more of embodiments 3 to 8, characterized in that the at least one chain extender (c) is selected from the group consisting of water, ethylene glycol, diethylene glycol, triethylene glycol, 1,3-propanediol, 1,4-butanediol, 1,5-pentanediol, 1,6-hexanediol, hydroquinone bis 2-hydroxyethyl ether, bis-2(hydroxyl ethyl)-terephthalate, glycerine and triethanolamine.

10. The composition according to one or more of embodiments 3 to 9, characterized in that the at least one chain extender (c) is 1,4-butanediol.

11. The composition according to one or more of embodiments 1 to 10, characterized in that the at least one primary flame retardant (B) is selected from the group consisting of melamine, melamine cyanurate, melamine borate, melamine polyphosphate and melamine derivatives.
12. The composition according to one or more of embodiments 1 to 11, characterized in that the at least one primary flame retardant (B) is melamine cyanurate.
13. The composition according to one or more of embodiments 1 to 12, characterized in that the amount of the at least one primary flame retardant (B) is in the range of ≥1 wt.-% to ≤80 wt.-% based on the total weight of the composition.
14. The composition according to one or more of embodiments 1 to 13 further comprising at least one secondary flame retardant (B1) selected from the group consisting of derivatives of phosphoric acid, derivatives of phosphonic acid and derivatives of phosphinic acid.
15. The composition according to embodiment 14, characterized in that the at least one secondary flame retardant (B1) is selected from the group consisting of resorcinol bis(diphenyl phosphate) (RDP), bisphenol A bis(diphenyl phosphate) (BDP) and diphenyl cresyl phosphate (DPC).
16. The composition according to embodiment 14 or 15, characterized in that the at least one secondary flame retardant (B1) is resorcinol bis(diphenyl phosphate) (RDP).
17. The composition according to one or more of embodiments 1 to 16, characterized in that the weight ratio between the at least one primary flame retardant (B) and the at least one secondary flame retardant (B1) is in the range of ≥1.0:1.0 to ≤5.0:1.0.
18. The composition according to one or more of embodiments 1 to 17, characterized in that the at least one secondary flame retardant (B1) is in the range of ≥1 wt.-% to ≤80 wt.-% based on the total weight of the composition.
19. The composition according to one or more of embodiments 1 to 18, characterized in that the at least one metal carbonate particle (C) has a volume average particle size $D_{50}$ in the range of ≥1.0 μm to ≤5.0 μm determined by laser diffraction analysis according to ISO 13320:2009.
20. The composition according to one or more of embodiments 1 to 19, characterized in that the at least one metal carbonate particle (C) is selected from the group consisting of calcium carbonate, magnesium carbonate, aluminum carbonate, zinc carbonate and a mixture thereof.
21. The composition according to one or more of embodiments 1 to 20, characterized in that the at least one metal carbonate particle (C) is calcium carbonate having a volume average particle size $D_{50}$ in the range of ≥1.0 μm to ≤5.0 μm determined by laser diffraction analysis according to ISO 13320:2009.
22. The composition according to one or more of embodiments 1 to 21, characterized in that the at least one metal carbonate particle (C) is in an amount in the range of ≥0.1 wt.-% to ≤10.0 wt.-% based on the total weight of the composition.
23. The composition according to one or more of embodiments 1 to 22 further comprising at least one additive (D) selected from the group consisting of antioxidant, light stabilizer, UV absorbers, and other process stabilizers.
24. The composition according to one or more of embodiments 1 to 23, characterized in that the amount of the at least one additive (D) is in the range of ≥0.1 wt.-% to ≤10.0 wt.-% based on the total weight of the composition.
25. A process for preparing the composition according to one or more of embodiments 1 to 24, comprising the steps of:
   mixing the at least one thermoplastic polyurethane (A), at least one primary flame retardant (B) and the at least one metal carbonate particle (C) optionally in the presence of the at least one secondary flame retardant (B1) and/or the at least one additive (D), wherein the at least one thermoplastic polyurethane (A) has a Shore A hardness of 40 to a Shore D hardness of 80 determined according to DIN ISO 7619-1 (3s), and
   wherein the at least one metal carbonate particle (C) has a volume average particle size $D_{50}$ in the range of ≥1.0 μm to ≤10.0 μm determined by laser diffraction analysis according to ISO 13320:2009.
26. Use of the composition according to one or more of embodiments 1 to 24 or the composition obtained according to embodiment 25 as a thermal and/or electrical insulator for electrical conductors or as jacketing for electrical conductors in wire and/or cable construction.
27. An article comprising the composition according to one or more of embodiments 1 to 24 or as defined in embodiment 26.
28. The article according to embodiment 27, which is an insulator of an electric wire and/or electric cable or an electric wire and/or electric cable sheath.
29. A process for producing a wire and/or cable construction comprising the steps of:
   (A') extruding an insulation layer of the composition according to one or more of embodiments 1 to 24 or the composition obtained according to embodiment 25 onto at least one metal conductor to obtain a wire and/or cable construction having a shore hardness ranging from a Shore A hardness of 40 to a Shore D hardness of 80 determined according to DIN ISO 7619-1 (3s) and a tear propagation resistance of at least 60 kN/m determined according to DIN ISO 34-1 B(b).
30. A wire and/or cable construction comprising:
   (X) at least one metal conductor, and
   (Y) an insulation layer of the composition according to one or more embodiments 1 to 24 or the composition obtained according to embodiment 25,
   wherein the wire and/or cable construction meets the requirements of ISO 6722 and LV112 for 3000 h at 85° C. and 85% relative humidity and 3000 h at 125° C.

Examples and Comparative Examples
Compounds

| | |
|---|---|
| TPU | Elastollan ® 1185A10 obtained from BASF |
| Primary flame retardant | Melapur ® MC 15 ED obtained from BASF |
| Secondary flame retardant | Fyrolflex ® RDP obtained from Supresta ® Netherlands B.V. |
| Metal carbonate particle | Calfort ® 5 obtained from S.A. Reverie Productos Minerales |

-continued

| Additive 1 | Irganox ® 1010 obtained from BASF |
| Additive 2 | Irganox ® 1098 obtained from BASF |

Standard Methods

| Number average molecular weight ($M_n$) | DIN 55672-1 |
| Elongation at break | DIN 53504 |
| Density | DIN EN ISO 1183-1 |
| Tear propagation resistance | DIN ISO 34-1, B(b) |
| Abrasion resistance | DIN 53516 |
| Shore hardness | DIN ISO 7619-1 (3s) |
| Volume average particle size | ISO 13320: 2009 |

Synthesis

The mixtures were each produced using a twin-screw extruder model ZE 40 A from Berstorff having a process part length of 35 D divided into 10 barrels. The flame retardant (primary and optionally secondary) was introduced into zone 5. Pelletization was carried out in a commercial underwater pelletization device. The pellets obtained were then dried in a fluidized-bed dryer at temperatures in the range from 60° C. to 100° C. and residence time of from 5 to 10 minutes to water contents of <0.03% and subsequently heat treated at 80° C. for 15 h. The composition of different inventive examples (I.E.) as well as comparative examples (C.E.) is listed below in Table 1.

TABLE 1

|  | C.E. 1 | C.E. 2 | I.E. 1 | I.E. 2 | I.E. 3 |
| --- | --- | --- | --- | --- | --- |
| TPU | 66.5 g | 80 g | 65.5 g | 64.5 g | 79 g |
| Primary flame retardant | 25 g | 20 g | 25 g | 25 g | 20 g |
| Secondary flame retardant | 7.5 g | — | 7.5 g | 7.5 g | — |
| Metal carbonate particle | — | — | 1.0 g | 2.0 g | 1.0 g |
| Additive 1 | 0.5 g | 0.5 g | 0.5 g | 0.5 g | 0.5 g |
| Additive 2 | 0.5 g | 0.5 g | 0.5 g | 0.5 g | 0.5 g |

Production of Test Specimen and Determination of Mechanical Properties

Films having a thickness of 1.6 mm were extruded from the pellets using an Arenz single-screw extruder having a three-zone screw with mixing part and a screw ratio of 1:3 as a test specimen were used for determining the mechanical properties. Table 2 below lists the mechanical properties of the inventive as well as comparative examples.

TABLE 2

|  | C.E. 1 | C.E. 2 | I.E. 1 | I.E. 2 | I.E. 3 |
| --- | --- | --- | --- | --- | --- |
| Density (kg/m$^3$) | 1230 | 1210 | 1230 | 1230 | 1210 |
| Shore hardness A | 89 | 88 | 89 | 89 | 88 |
| Tensile strength (MPa) | 27 | 43 | 25 | 23 | 42 |
| Elongation at break (%) | 530 | 510 | 540 | 560 | 530 |
| Tear propagation resistance (kN/m) | 59 | 60 | 63 | 62 | 61 |
| Abrasion resistance (mm$^3$) | 31 | 32 | 36 | 38 | 33 |

Determination of Hydrolysis Resistance

In order to evaluate the hydrolysis resistance, the test specimen was stored at 85° C. and 85% relative humidity for 3000 h and mechanical properties were subsequently determined. The results are summarized in Table 3.

TABLE 3

|  | C.E. 1 | I.E. 1 | I.E. 2 | I.E. 3 |
| --- | --- | --- | --- | --- |
| Humid-hot 85/85/1000 h | | | | |
| Tensile strength (MPa) | 4 | 11 | 11 | 20 |
| Change in tensile strength (%) | −85 | −66 | −52 | −52 |
| Elongation at break (%) | 100 | 570 | 550 | 630 |
| Change in elongation at break (%) | −81 | 6 | −2 | 19 |
| Humid-hot 85/85/3000 h | | | | |
| Tensile strength (MPa) | 3 | 7 | 6 | 12 |
| Change in tensile strength (%) | −90 | −74 | −78 | −71 |
| Elongation at break (%) | 60 | 420 | 400 | 580 |
| Change in elongation at break (%) | −89 | −22 | −28 | 9 |

As evident above, the specimens having the metal carbonate particle i.e. the inventive examples 1, 2 and 3 show improved elongation at break at different conditions during humid-hot test. In fact, for C.E. 1 the elongation at break in the humid-hot test reduced by 81% of its original value of 530% (see Table 2). On the contrary, the present invention specimens, as illustrated by I.E. 1, 2 and 3, comprising the metal carbonate particle showcased very less reduction in the elongation at break. Moreover, the inventive examples also show improvement in their respective tensile strengths in contrast with the comparative examples, which show a drastic reduction.

Wire and/or cable construction made from the composition of the present invention was subjected to winding test. This test makes it possible to analyse the mechanical resilience of the electrically insulating layer made from the composition of the invention and thus its capacity to craze following the application of a shape modification. By the term "craze", it is referred to the development of cracks upon winding the wire. In the course of the test, the wire was wound around its own diameter by several turns stuck to one another. An internal standard imposes a resistance of the coating over a minimum of 3 turns stuck to one another. The test was carried out several times and showed no crazing.

Such an improvement in this mechanical property renders the present invention composition suitable in the automobile industry for wire and/or cable construction application.

The invention claimed is:

1. A composition, comprising:
    a thermoplastic polyurethane obtained by reacting:
    a) a polyol,
    b) an isocyanate,
    c) optionally a chain extender,
    a flame retardant, and
    a metal carbonate powder, wherein the metal carbonate powder is present in an amount of 0.5 wt.-% to 2.0 wt.-% based on a total weight of the composition, wherein a volume average particle size $D_{50}$ for the metal carbonate is in a range of ≥1.0 μm to ≤10.0 μm.

2. The composition according to claim 1, wherein the metal carbonate powder is selected from the group consisting of calcium carbonate, magnesium carbonate, aluminium carbonate, zinc carbonate and mixtures thereof.

3. The composition according to claim 1, wherein the metal carbonate powder is calcium carbonate.

4. The composition according to claim 1, wherein the polyol is polyether polyol or polycarbonate polyol.

5. The composition according to claim 1, wherein the flame retardant is selected from the group consisting of melamine, melamine cyanurate, melamine borate, melamine polyphosphate, a melamine derivative, a derivative of phosphoric acid, a derivative of phosphonic acid, a derivative of phosphinic acid and mixtures thereof.

6. The composition according to claim 1, wherein the flame retardant comprises a mixture of a derivative of phosphoric acid and melamine cyanurate.

7. The composition according to claim 1, further comprising at least one additive selected from the group consisting of an antioxidant, a light stabilizer, a UV absorber, and a stabilizer other than the antioxidant, the light stabilizer and the UV absorber.

8. The composition according to claim 7, wherein the composition comprises the antioxidant and the antioxidant comprises an active group of the following formula (II),

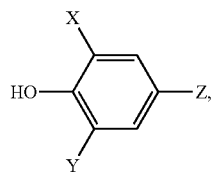
(II)

wherein, $X^1$ and $Y^1$, independently of one another, are hydrogen atom or a straight-chain, branched or cyclic alkyl radical of 1 to 12 carbon atoms, and Z is a covalent bond via which the active group is bonded to the remaining molecule of the antioxidant and the active group of formula (II) is further connected by a connecting residue such that the antioxidant has the following structure:

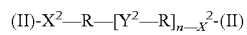

or

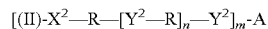

wherein, $X^2$: —O—, —S— or —NH—, $Y^2$: —O— or —S—,

R is a straight chain or branched alkylene radical of 2 to 12 carbon atoms, n is an integer, m is 2, 3, 4, 5, 6, 7 or 8, and A is a hydrocarbon structure comprising 3 to 20 carbon atoms.

9. The composition according to claim 8, wherein the antioxidant is selected from the group consisting of pentaerythrityl tetrakis(3-(3,5-bis(1,1-dimethylethyl)-4-hydroxyphenyl)propionate, (N,N'-hexamethylenebis(3,5-di-tert-butyl-4-hydroxy-hydrocinnamide), 3-(3,5-di-tert-butyl-4-hydroxyphenyl)propionate-terminated polyethyleneglcyol, and 3-(3,5-di-tert-butyl-4-hydroxyphenyl)propionate-terminated polytetrahydrofuran.

10. A process for preparing the composition according to claim 1, the process comprising mixing the thermoplastic polyurethane, the flame retardant and the metal carbonate powder.

11. An article, comprising the composition according to claim 1.

12. A method of producing an article comprising the composition according to claim 1, the method comprising extruding, calendaring, or moulding.

13. The method according to claim 12, wherein the article is an insulator.

14. A method of producing an article comprising a composition obtained by the process of claim 10, the method comprising extruding, calendaring, or moulding.

15. The method of claim 14, wherein the article is an insulator.

* * * * *